United States Patent Office
3,535,950
Patented Oct. 27, 1970

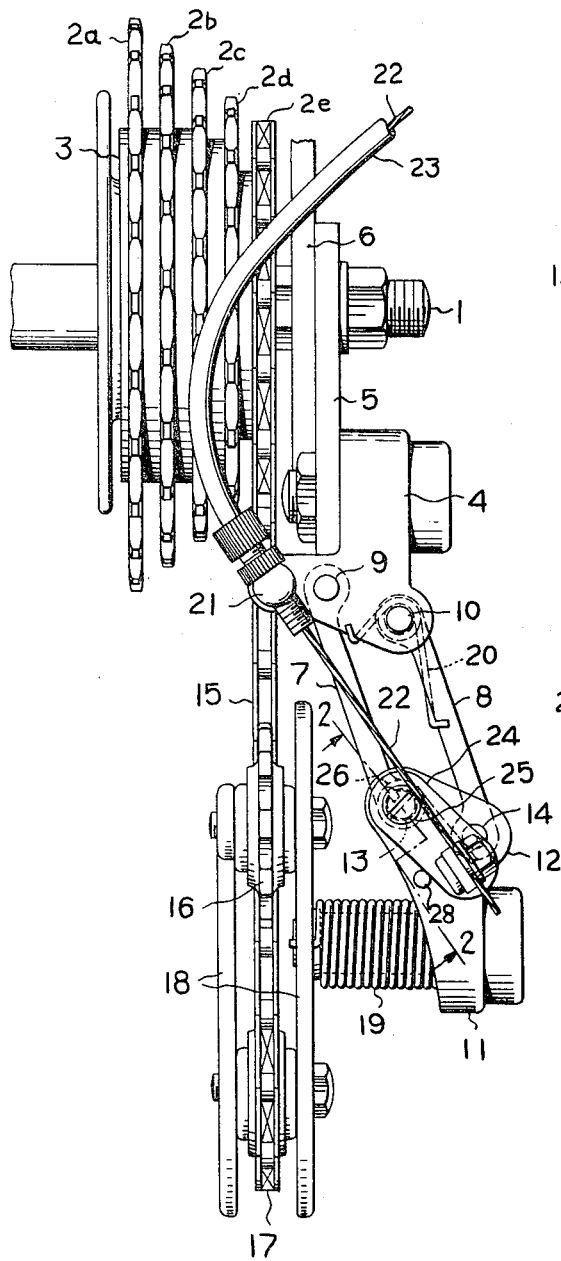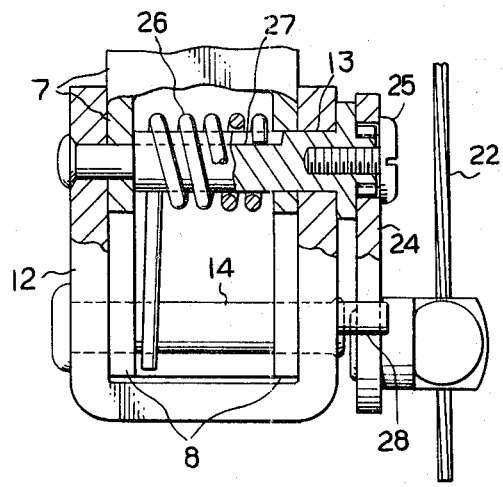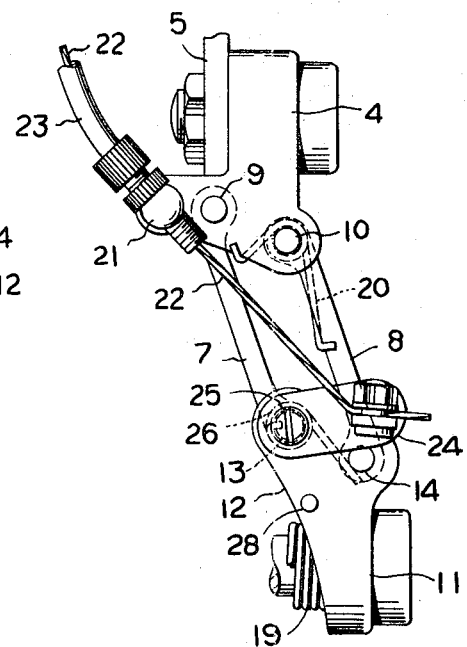

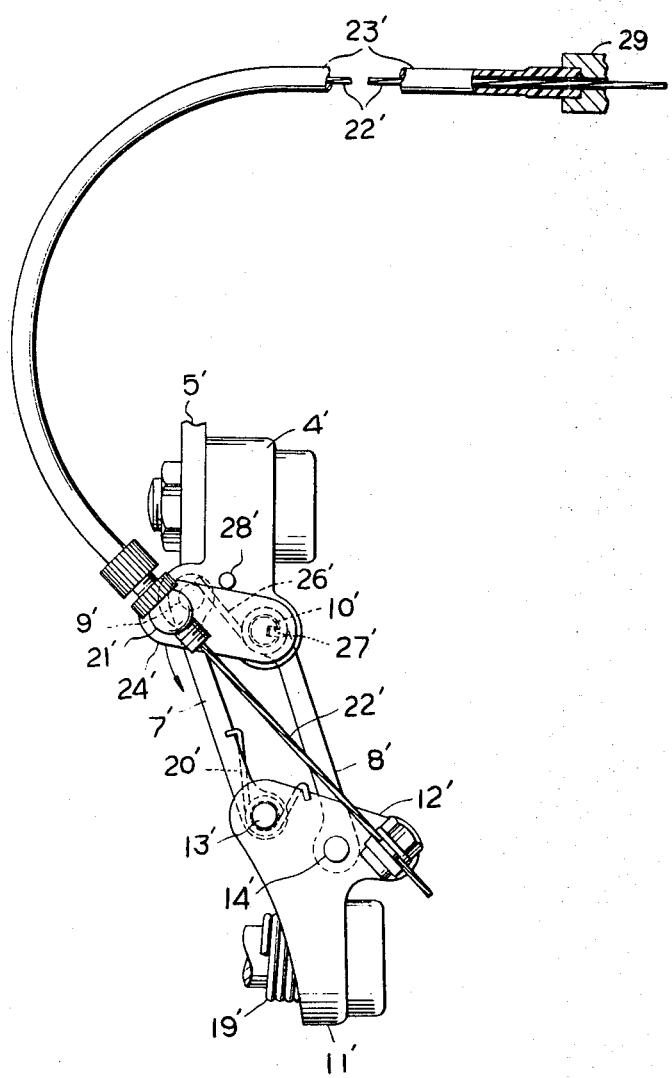

3,535,950
EXPOSED SPEED CHANGE MECHANISM
FOR A BICYCLE
Keizo Shimano, Masayoshi Kine, and Takuo Ishida, Sakai, Osaka, Japan, assignors to Shimano Kogyo Kabushiki Kaisha, Osaka, Japan
Filed Nov. 1, 1968, Ser. No. 772,549
Claims priority, application Japan, Nov. 13, 1967, 42/72,593
Int. Cl. F16c 1/10; G05g 9/12
U.S. Cl. 74—473                               4 Claims

ABSTRACT OF THE DISCLOSURE

An exposed speed change mechanism for a bicycle, in which a driving chain running on a chain guide wheel may be arranged to selectively engage one of a plurality of sprocket wheels constituting a multistage sprocket assembly mounted on a rear axle of a bicycle by manipulating a Bowden wire adapted to deform a pantagraph mechanism associated with said chain guide wheel, the deformation being accomplished through a resilient member and a rocker arm each mounted to said pantagraph mechanism.

---

In a conventional exposed speed change mechanism of such type, wherein a driving chain running on a chain guide wheel may be arranged to selectively engage one of a plurality of sprocket wheels constituting a multistage sprocket wheel assembly mounted on a rear axle of a bicycle by manipulating a Bowden wire adapted to deform a pantagraph mechanism associated with said chain guide wheel, it is customary to carry out shifting operation of said driving chain from one of the sprocket wheels to the other during driving a bicycle for the purpose of immediately changing a speed of the bicycle. However, if the bicycle makes a stop when the speed change mechanism is in a high speed transmission condition, in restarting the drive of the bicycle the operator is obliged to first drive the bicycle in the same condition. In this case, even if the operator intends to change the speed change mechanism from said high speed transmission condition to the other, he can not shift the driving chain from one of the sprocket wheels to the other. As a result of operation of the Bowden wire, the inner wire thereof has a large magnitude of tensile stress exerted thereon and becomes elongated, resulting in interference with the normal change-over operation of the speed change mechanism.

It is accordingly the principal object of the invention to provide an improved speed change mechanism, in which in case a bicycle is at a stop, the Bowden wire may be brought into a preparatory position for desired change-over operation without any excessive stress having exerted thereon, so that the desired change-over operation can be automatically accomplished at the time when the bicycle starts.

Other objects and advantages of the invention will become more apparent upon a reading of the following description with reference to the accompanying drawings, in which:

FIG. 1 is a rear view of the exposed speed change mechanism according to the present invention, the parts thereof being arranged in a high speed-ratio transmission position;

FIG. 2 is an enlarged view showing the essential parts of the present invention, partly in cross-section as seen generally on line 2—2 of FIG. 1;

FIG. 3 is a rear view of the essential parts of the present invention, in which a controlling Bowden wire is in a preparatory position for change-over operation; and FIG. 4 is a rear view of the essential parts of a modified form.

Referring now to the drawing, FIG. 1 is a rear view of the speed change mechanism forming an embodiment of this invention, in which the reference numeral 1 designates a rear wheel axle of a bicycle. At the right-hand end portion of the axle 1, there is mounted a multistage sprocket wheel assembly comprising a plurality of sprocket wheels 2a, 2b, 2c, 2d and 2e each having a different number of teeth or of different diameter, the smallest sprocket wheel 24, i.e. highest speed-ratio sprocket wheel being arranged on the outermost position as shown. Said plurality of sprocket wheels are mounted on a common free wheel 3, thereby forming the multistage sprocket wheel assembly. Adjacent the outermost sprocket wheel 2e, there is a bracket 5 securely mounted to a rear solid end 6 of the bicycle frame and provided with a depending support 4. A pair of links 7 and 8 are pivotally mounted to the support 4 by means of pins 9 and 10 respectively, and the lower ends of the links are pivotally connected to an actuator 12, having an extension 11, by means of pins 13 and 14 respectively, thereby forming a pantagraph consisting of the support 4, the links 7–8 and the actuator 12. Secured to the extension 11, there is a change-over frame 18 having a guide wheel 16 and a tension wheel 17 for an endless driving chain 15, which is urged by a spring 19 in a manner allowing the driving chain 15 to be strained. Said pantagraph mechanism is further provided with a returning spring 20 having a tendency of urging the guide wheel 16 toward the high speed-ratio position of the sprocket wheel assembly, i.e. outwardly.

An actuating Bowden wire associated with the depending support 4 and the actuator 12 has an inner wire 22 connected at its upper end to a control device (not shown) on a bicycle handle adapted to be manipulated by an operator. The Bowden wire is so arranged that if the same is normally pulled against the action of said spring 20 and the pantagraph mechanism is deformed inwardly, thereby maintaining the guide wheel 16 in the position corresponding to the low speed-ratio position of the sprocket wheel assembly.

As will be seen referring to FIGS. 1–3, a flexible sheath 23 of the Bowden wire is connected at the lower end to a plug 21 mounted on the support 4 at a position slightly apart inwardly from the pin 9, while the lower end of the inner wire 22 is connected to one end of a rocker arm 24 by suitable means in a convenient manner. The other end of said rocker arm 24 is secured to the rotatably mounted pin 13 by means of a screw 25, and as best shown in FIG. 2, the same is in spline engagement with said rotatably mounted pin 13. Mounted on said pin 13, there is a resilient member, such as a torsion spring 26 having the strength greater than that of the returning spring 20 on the pin 10, one end of which engages a longitudinally cut groove 27 on the pin 13, and the other end of which is held abutting against the pin 14. The spring 26 is so arranged that when the inner wire 22 is pulled upwardly it will resist a tendency in rotation of the rocker arm 24. The actuator 12 is provided with a stop pin 28, thereby normally maintaining the rocker arm 24 in a definite position in cooperation with said spring 26.

The operation of the above-mentioned embodiment will now be described with particular reference to a case where the driving chain 15 is intended to be shifted from the outermost sprocket wheel 2e to the following sprocket wheel 2d, that is, from the high speed-ratio position to the low speed-ratio position, by the operation of the Bowden wire through the change-over device on the bicycle handle.

In a case where the bicycle is running, if the inner wire 22 is pulled upwardly, then the pantagraph mechanism will be oscillated inwardly against the action of the spring 20 in a usual manner, wherein the spring 26 is not deformed or the positional relation between the actuator 12 and the arm 24 is not collapsed because of the greater strength of the spring 26. On the contrary, when the bicycle is at a stop, as it is impossible to shift the driving chain 15 from the outermost sprocket wheel 2e to the succeeding sprocket wheel 2d, the pantagraph mechanism cannot be oscillated inwardly. Therefore, upon pulling the inner wire 22 upwardly, the rocker arm 24 will be rotated in the counterclockwise direction as shown in FIG. 3 while the spring 26 is deformed to be energized and to prevent the inner wire 22 from having an excessive tension exerted thereon. Thus, the spring 26 is energized and the Bowden wire is brought into a preparatory position for change-over operation. Now, when the bicycle begins to start under the above-mentioned condition, the pantagraph mechanism will be deformed inwardly due to the action said energized spring 26 overcoming that of the spring 20, and therefore the driving chain 15 can be shifted from the outermost sprocket wheel 2e to the succeeding sprocket wheel 2d.

In FIG. 4, the construction of the speed change mechanism in modified form is shown, wherein similar reference characters denote similar parts. A lower end of an inner link 7' is pivotally connected to an actuator 12' by means of a pin 13', which is merely for pivotably carrying the link 7', and the upper end thereof is also pivotally connected to a support 4' by means of a pin 9'. On the other hand, a lower end of an outer link 8' is pivotally connected at 14' to the actuator 12', and the upper end thereof is also pivotally connected to the support 4' by means of a pin 10'. Said pin 10' is mounted to the support 4' in such a rotatable manner as in the pin 13 of the above-mentioned embodiment. A rocker arm 24' is securely connected at its one end to said pin 10' while being provided at the other end with a plug 21' for receiving a flexible sheath 23' of a Bowden wire. A lower end of an inner wire 22' is securely connected to the actuator 12' in a usual manner.

Mounted on the pin 10', there is a resilient member, such as a torsion spring 26' having the strength greater than a returning spring 20' mounted on the pin 13', one end of which engages a longitudinal groove 27' on the pin 10', and the other of which is held abutting against the pin 9' to exhibit a tendency of urging the pin 10' along with the rocker arm 24' in a clockwise direction in FIG. 4. The support 4' is provided with a stopper stop pin 28', thereby normally maintaining the rocker arm 24' in a definite position in cooperation with the spring 26'.

The operation of the embodiment in modified form will now be described with particular reference to a case where a bicycle is changed-over from a high speed-ratio drive to a low speed-ratio drive.

In a case where the bicycle is running, when the inner wire 22' is manipulated by the operator the pantagraph mechanism will be oscillated inwardly against the action of the spring 20', having a tendency of urging the pantagraph mechanism outwardly, without deforming the spring 26', as in the previous embodiment. On the contrary, when the bicycle is at a stop, as it is impossible to deform the pantagraph mechanism inwardly as previously described, upon pulling the inner wire 22' upwardly the sheath 23' connected between a stationary plug 29 and the movable plug 21' exerts force on the rocker arm 24' to turn the latter in the direction of the arrow, while at the same time the spring 26' is deformed to be energized and to prevent the inner wire 22' from having any excessive tension exerted thereon. Thus, the spring 26' is energized and the Bowden wire is brought into a preparatory position for change-over operation. Now, when the bicycle begins to accelerate under the above-mentioned condition, the pantagraph mechanism will be deformed inwardly due to the action of said energized spring 26' overcoming that of the spring 20', whereby a desired change-over operation can be automatically accomplished.

From the foregoing it will be seen that according to the present invention the resilient member mounted adjacent the one end of the pantagraph mechanism is associated with the lower end of the inner wire, so that the inner wire and the resilient member may be attached to their own positions in a simplified manner. Further, in another embodiment of the invention, since the support forming a part of the pantagraph mechanism is provided with the rocker arm being spring-urged in the clockwise direction in FIG. 4 while the inner wire is connected at the lower end to the actuator, the inner wire is prevented from elongation and therefore any change-over operation can be effectively carried out.

In the embodiments illustrated, the change-over frame is always spring-urged toward the high speed-ratio position of the sprocket wheel assembly. However, it will be easily understood that this invention may be adapted to such a mechanism that a change-over frame is always spring-urged toward the low speed-ratio position.

What we claim is:

1. In an exposed change speed mechanism for a chain-driven bicycle, comprising:
   (a) a wheel (16) for guiding a driving chain (15);
   (b) a wheel (17) for tensioning said chain;
   (c) a turnable frame (18) having said guide and tension wheels mounted thereon for rotation;
   (d) a Bowden wire means (22, 23) for controlling a displacement of said chain;
   (e) a multistage sprocket wheel assembly comprising a plurality of sprocket wheels of different diameters and mounted on a rear wheel axle of said bicycle, said sprocket wheels being selectively engaged by said chain running on said guide and tension wheels by manipulating said Bowden wire means,
   (f) a bracket (5) mounted to said rear wheel axle,
   (g) a pantagraph mechanism carried by said bracket, comprising a support (4) and generally parallel linkage means secured to said bracket, an actuator (12) movable via said linkage means in parallelogramic relation with said support and actuating said frame (18) responsive to its movement to effect the chain displacement, said linkage means including links (7) (8) pivotally arranged between said support (4) and said actuator (12), and means (9, 10, 13, 14) for pivotally connecting said links to said support and said actuator, respectively;
   (h) first resilient means (20) for urging said pantagraph mechanism in one direction, said first means (20) being provided on and operably connected with said pantagraph mechanism;
   (i) a rocker arm (24) having opposed ends operatively connected with said Bowden wire and pivotally connected to said pantagraph mechanism, and
   (j) second resilient means (26) for urging said rocker arm (24) in a direction opposite said one direction, said second means (26) being provided on and operably connected with said pantagraph mechanism and having a strength greater than that of said first resilient means (20).

2. An exposed change speed mechanism as defined in claim 1, wherein said Bowden wire means includes an inner cable (22) and an outer sheath (23); and said rocker arm (24) is integrally connected at one of its ends to one (13) of said means for pivotally connecting said links to said actuator (12) and at the other end to one end of an inner cable (22) of said Bowden wire means, and said support (4) is connected to one end of a sheath (23) of said Bowden wire means.

3. An exposed change speed mechanism as defined in claim 1 wherein said Bowden wire means includes an inner cable (22') and an outer sheath (23'); and said rocker arm (24') is integrally connected at one of its ends to one (10') of said means for pivotally connecting said links to said support (4') and at the other end to one end of a sheath (23') of said Bowden wire means, and said actuator (12') is connected to one end of an inner cable (22') of said Bowden wire means.

4. An exposed change speed mechanism as defined in claim 1 wherein said rocker arm is integrally connected to one of said means for pivotally connecting said links to said support and said actuator, and said second resilient means is a coil-like torsion spring, the one end thereof being engaged in a groove formed in the aforesaid means to which said rocker arm is connected to and the other end abutting another one of said means for pivotally connecting said links to said support and said actuator, thereby urging said rocker arm in its said direction.

References Cited

UNITED STATES PATENTS

| | | | |
|---|---|---|---|
| 2,956,443 | 10/1960 | Nelson. | |
| 3,104,559 | 9/1963 | Dotter | 74—502 XR |
| 3,181,384 | 5/1965 | Juy | 74—502 XR |
| 3,125,894 | 3/1964 | Juy | 74—473 |
| 3,442,148 | 5/1969 | Juy | 74—470 |

MANUEL A. ANTONAKAS, Primary Examiner

U.S. Cl. X.R.

74—501